United States Patent [19]
Peckham, Jr.

[11] 3,882,971
[45] May 13, 1975

[54] BICYCLE POWER BRAKE

[76] Inventor: Victor A. Peckham, Jr., 1151 Fifth St., Manhattan Beach, Calif. 90266

[22] Filed: Mar. 13, 1974

[21] Appl. No.: 450,886

[52] U.S. Cl.............. 188/24; 188/140 R; 188/2 D
[51] Int. Cl............................................. B62l 1/12
[58] Field of Search .......... 188/24, 346, 71.1, 72.1, 188/2 D, 140 R

[56] References Cited
UNITED STATES PATENTS
3,842,946   10/1974   Blevens............................... 188/24

FOREIGN PATENTS OR APPLICATIONS
924,490   8/1947   France................................. 188/24
420,844   12/1934   United Kingdom.................... 188/24

Primary Examiner—Duane A. Reger
Assistant Examiner—Edward R. Kazenske
Attorney, Agent, or Firm—Brown, Murray, Flick & Peckham

[57] ABSTRACT

A caliper brake is mounted on a fork of a bicycle and straddles the peripheral portion of the wheel that is mounted in the fork. In front of the brake a clamp straddles the peripheral portion of the wheel, but is supported by a device that is movable forward and backward relative to the bicycle frame. The clamp normally is disengaged from the wheel. A manually operable device is connected with the clamp for clamping it against the rotating wheel so that the movable supporting device will be moved forward by the wheel. When this occurs, an actuating device operably connecting the supporting device with the brake applies the brake to the wheel with considerable force.

7 Claims, 6 Drawing Figures

BICYCLE POWER BRAKE

There are two principal types of bicycle brakes. One, the coaster brake, is housed in the hub of the rear wheel of a bicycle and is operated by pressing downwardly on the bicycle pedal that at that time happens to be located behind the axis of the sprocket to which the pedals are connected. The other type of brake is the caliper brake, which includes a pair of levers that are pivotally connected together above the rear tire and straddle that tire and the rim. The lower ends of the levers are provided with rubber blocks for frictionally engaging the opposite sides of the rim when the upper ends of the levers are squeezed together by a flexible wire that is pulled when the bicycle rider squeezes an operating lever attached to the handle bars. A similar caliper brake, operated by a second hand lever, often is associated with the front wheel of the bicycle, in which case both hand levers generally are squeezed at the same time. Caliper brakes are effective when sufficient pressure is applied to the hand levers to cause the brakes to tightly grip the rims of the wheels, but with some people, especially children, enough pressure may not or possibly cannot be applied to prevent the wheels from sliding across the brake blocks when a quick stop is desired. A large share of the problem is due to deflections, stretch, clearances and brake block compression in the brake rigging, all of which occur in practice and increase the work i.e., force times distance, necessary for applying the brakes.

It is among the objects of this invention to provide a bicycle brake of the caliper type which requires very little pressure on the operating lever to apply the brake tightly to a wheel, which is relatively simple in construction, and which uses the inertia of the bicycle as power to apply the brake.

The invention is illustrated in the accompanying drawings, in which.

Figure 1:
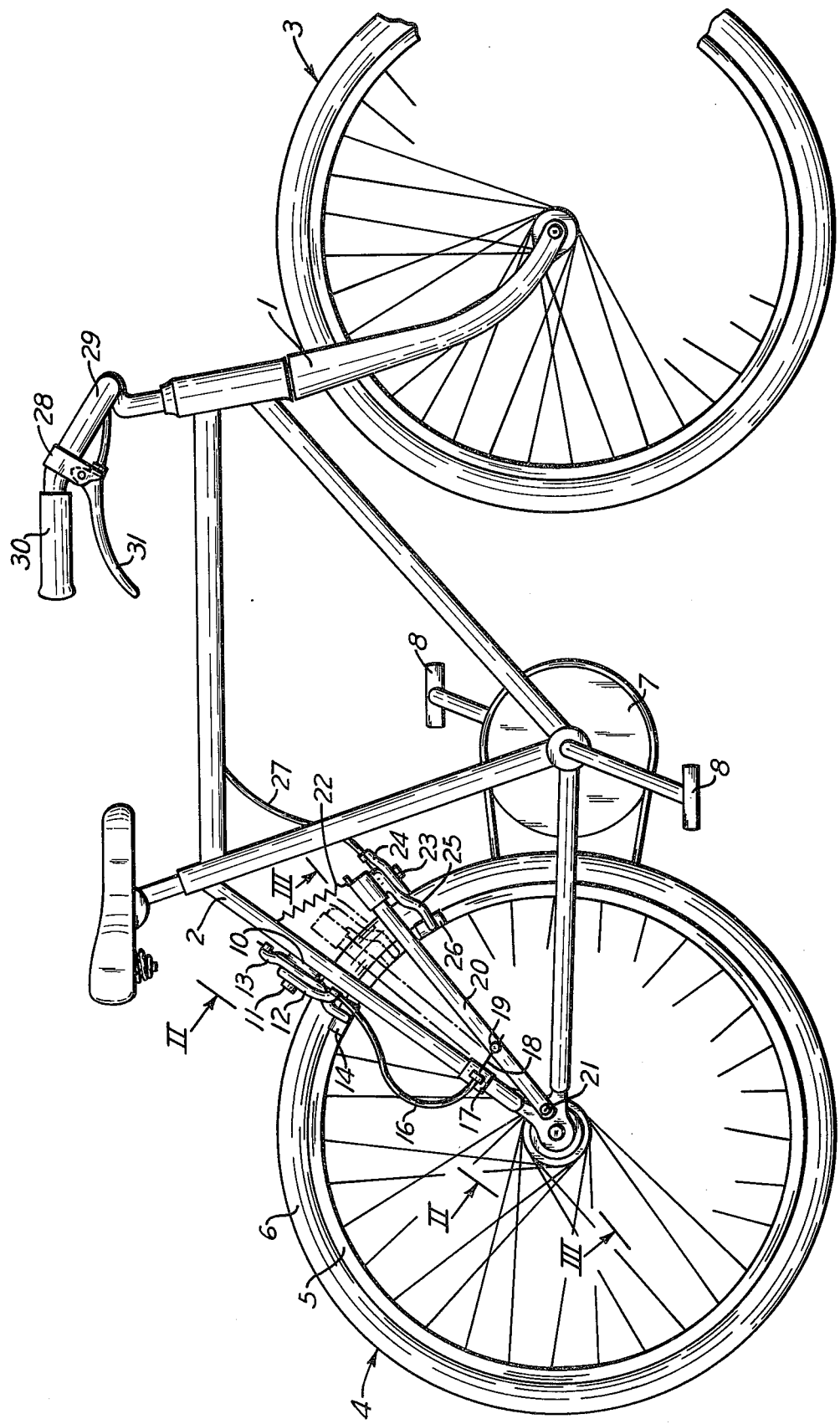
FIG. 1 is a side view of a bicycle provided with my brake, showing the brake applied to a wheel.
Figure 2:
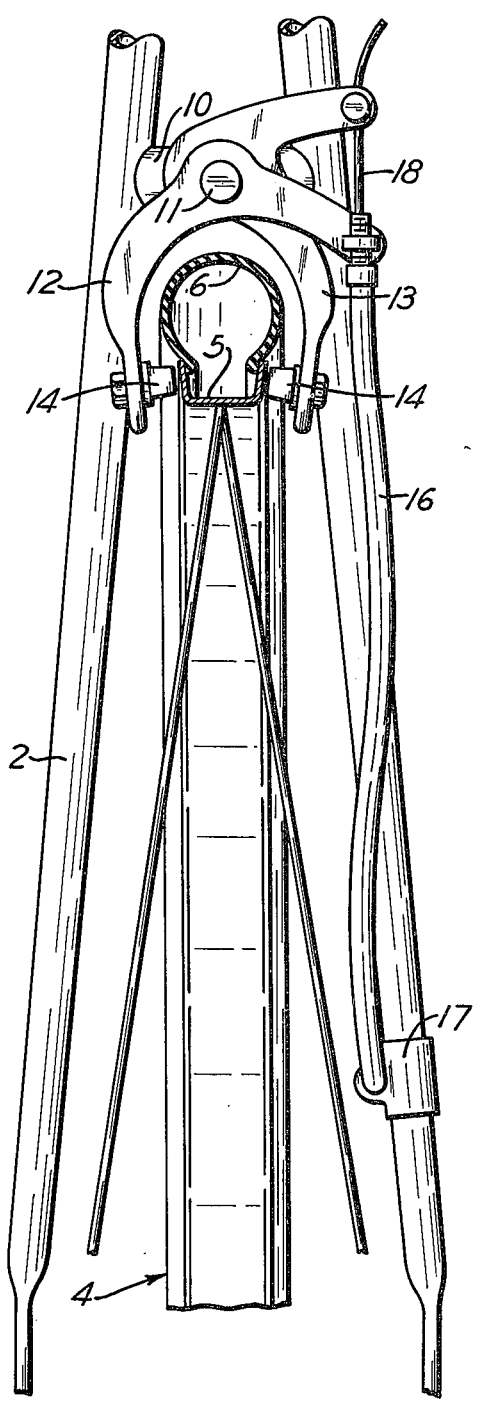
FIGS. 2 and 3 are enlarged fragmentary sections taken on the lines II—II and III—III, respectively, of FIG. 1 and showing the brake and clamp released.
Figure 3:
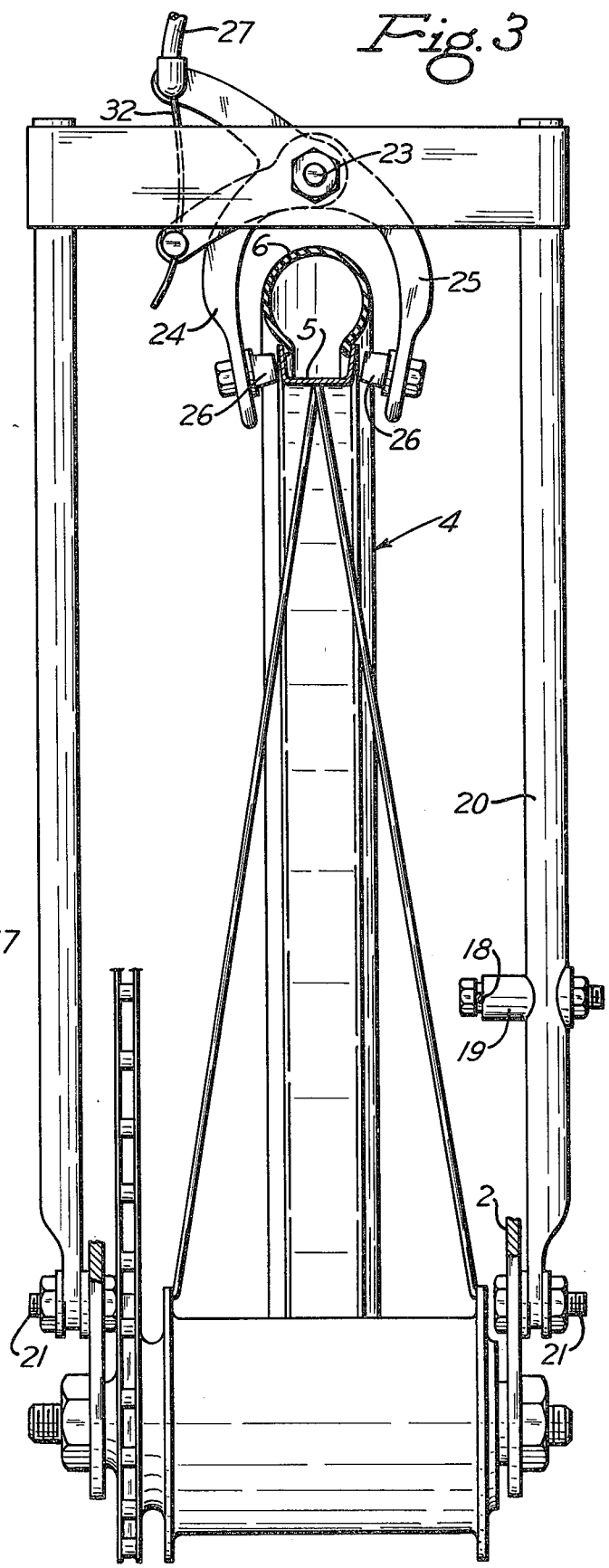

Referring to FIGS. 1, 2 and 3 of the drawings, a bicycle of conventional construction has a frame provided with the usual front and rear forks 1 and 2, in the lower ends of which the axles of the front and rear wheels 3 and 4 are mounted. The rear wheel includes a rim 5 encircled by a pneumatic tire 6. The wheel is driven by the usual chain and sprockets, the front sprocket 7 being rotatably mounted in the bottom of the frame between the wheels and turned by the usual pedals 8.

A short distance above the rear tire, the sides of the rear fork are connected by a cross piece 10 welded or clamped to them as shown in FIG. 2. Projecting rearwardly from the center of this cross piece in a direction perpendicular to the plane of the fork is a headed pivot member 11, on which the two levers 12 and 13 of a conventional caliper brake are pivotally mounted. Secured to the lower ends of these levers, between them and the sides of the wheel rim, are brake blocks 14 made of rubber or some other suitable friction material. The upper ends of both of these levers are shown extending away from the same side of the pivot member, but one is above the other in such relation that when they are moved toward each other the brake blocks likewise are moved toward each other. When the levers are released, their lower ends are disengaged from the wheel by a torsion spring (not shown) with which a caliper brake is provided.

Rigidly connected to the upper end of brake lever 12 is the upper end of a flexible tube 16, the lower end of which is rigidly connected to a bracket 17 secured to one side of rear fork 2 near its lower end, with the open end of the tube facing forward. A strong flexible cable or wire 18 extends through this tube and its upper end is rigidly connected to the outer end of the other brake lever 13 as shown in FIGS. 1 and 2. The lower end of the wire extends forward out of the lower end of the tube and is rigidly connected by any suitable means 19 to one side of the lower portion of an inverted U-shaped arm 20 that straddles the rear wheel directly in front of the rear fork. The rear or lower end of this arm is pivotally connected to the fork near the axis of the wheel by means of bolts 21 or the like. The upper end of the arm therefore can swing forward and back in a short arc that is substantially concentric with the wheel. The arm normally is held in an upper or rear position close to the fork by means of a coil spring 22 that connects it to the fork.

Outwardly of the tire, as shown in FIGS. 1 and 3, the cross piece that connects the two sides of arm 20 supports a headed pivot member 23 that extends forward. Pivotally mounted on this member are the two levers 24 and 25 of a clamp that can be in the form of a conventional caliper brake, although its primary function is not that of a brake but of a clutch for engaging the back wheel to provide means for transmitting power from the rotating wheel to the brake behind this clamp. The lower ends of the two clamp levers are provided with friction blocks 26 for engaging the opposite sides of the rim of the wheel, from which they normally are spaced by a torsion spring (not shown) that urges the lower ends of the levers apart. Since it is shown in FIG. 1 that the pivoted arm 20 forms the sole support for the clamp because the clamp is not mounted on the bicycle frame, it can be said that the clamp floats relative to the frame. The upper ends of these levers project from the same side of pivot member 23, and a flexible tube 27 is rigidly connected to the outer end of the upper lever 24. This tube extends forward in the usual manner along the top of the bicycle frame and up to a bracket 28 which is rigidly mounted on the handlebars 29 in front of one of the hand grips 30 and pivotally supports a hand lever 31. The front end of tube 27 is rigidly connected to the bracket in a well-known manner. Extending through the tube is a strong flexible wire 32 (FIG. 3), the front end of which is secured to the front end of the hand lever. The rear end of the wire extends out of the tube and down to the upper end of clamp lever 25, to which it is rigidly connected.

When the hand lever 31 is squeezed upwardly toward the hand grip above it, it pulls wire 32 forward in tube 27 and this causes the pivoted clamp to grip the rear wheel in the way that a caliper brake does. The moment this occurs, the upper end of the pivoted arm 20 is swung forward by the rotation of the wheel. This causes the arm to pull on the brake wire 18, which immediately applies the brake to the wheel to stop the wheel from turning. The arm needs to swing only a few degrees to accomplish this. A moderate amount of pressure applied to the hand lever is sufficient to apply the clamp to the wheel. The leverage then exerted by arm 20 pulls the brake wire with a great deal of force to apply the brake. The inertia of the moving bicycle therefore is used as the power for applying the brake, and the higher the speed of the bicycle the more quickly the brake will engage the wheel.

In a conventional caliper braking system on a bicycle, one must trade off the leverage available by a given movement of the hand lever against the travel of the lever. High leverage equals high cable force multiplied by short cable travel, while low leverage equals low cable force multiplied by long cable movement. In both cases, when cable force is multiplied by cable travel, there is insufficient work to do the job of applying the brakes fully. In my invention, on the other hand, the relatively light force of the clamp gripping the wheel rim is moved through a fairly long arc, whereby sufficient work is produced to accomplish the desired result. The point of attachment of brake wire 18 to arm 20 establishes the amount of force required at hand lever 31 to apply the brake. The nearer this point of attachment is to arm pivot 21, the easier the hand lever operation.

Such a power brake system can also be used with the front wheel of the bicycle if desired, but in such a case there should be a short safety chain connecting the pivoted arm with the front fork or steering post. In case the brake wire connecting the brake and arm happens to break or become disconnected, the chain would prevent the rotating front wheel from carrying the clamp around to the ground.

Also, if front and rear brakes are used, one of the handlebar hand levers can be eliminated by operating both brakes from a single clamp and pivoted arm connected to both brake-operating wires. The wheel associated with the clamp would then supply the power for applying both brakes.

Figure 5:
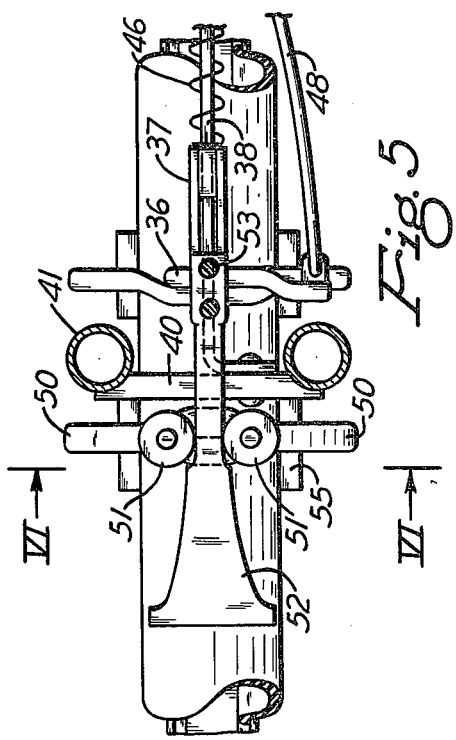
FIG. 5 is an enlarged horizontal section taken on the line V—V of FIG. 4.
Figure 6:
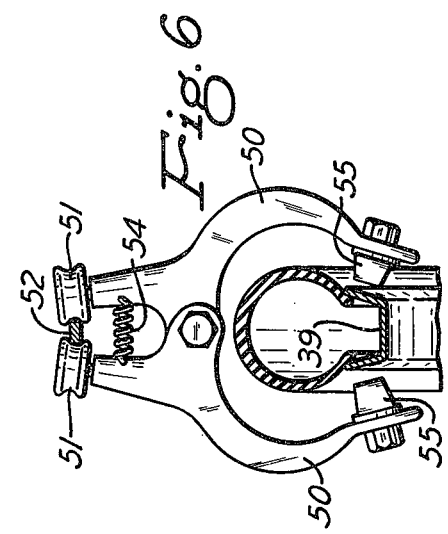
FIG. 6 is an enlarged cross section taken on the line VI—VI of FIG. 5.
Figure 4:
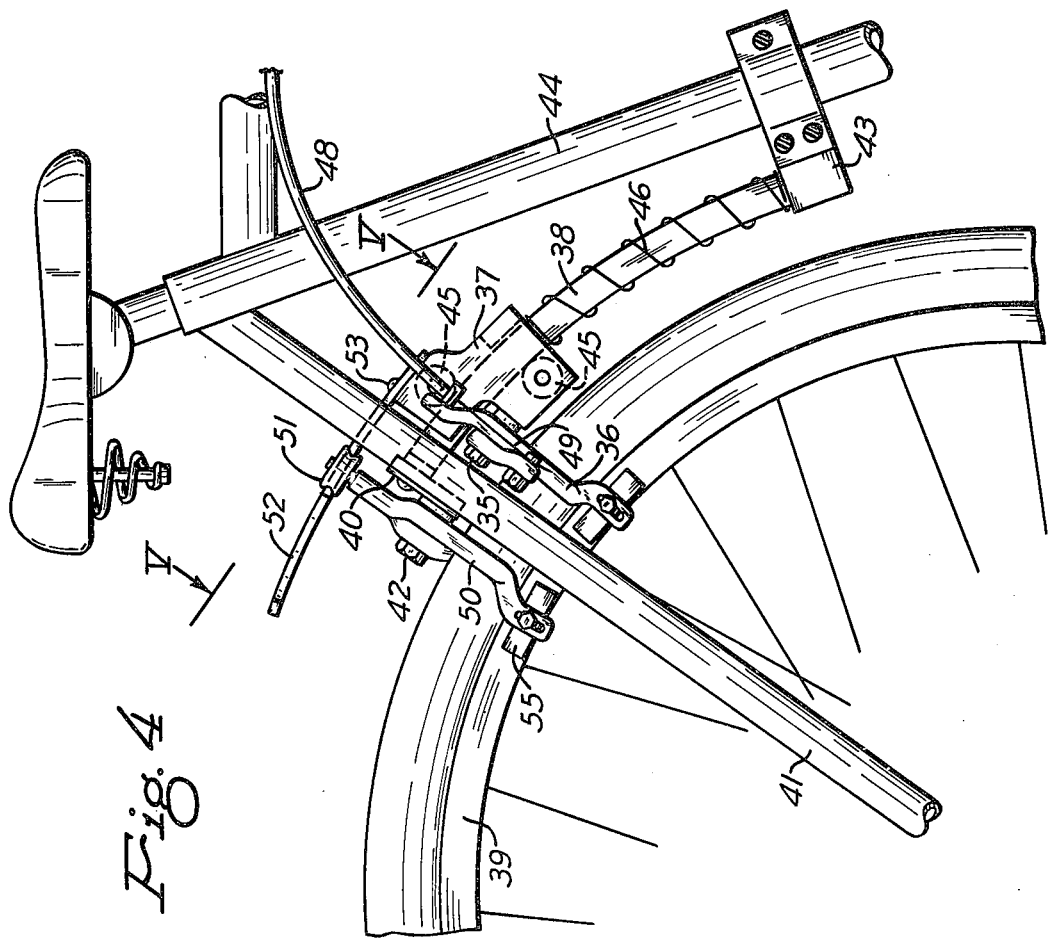
FIG. 4 is a fragmentary side view of a bicycle showing a modification, with the brake released.

In the modification shown in FIGS. 4, 5 and 6 the pivoted arm and the brake wire of the first embodiment are omitted. Instead, the pivot member 35 of the clamp 36 projects from the back of the lower part of the rear end of a carriage 37 that can travel along a curved bar 38. This bar is concentric with the rear wheel 39 and its upper end is mounted on a cross piece 40 secured to the back of the rear fork 41 above the pivot 42 for the caliper brake. The lower end of the bar is mounted in a bracket 43 secured to the bicycle frame 44. The bar extends through a passage through the carriage, which is provided with rollers 45 engaging the front and rear surfaces of the bar. The carriage normally is held in its upper position by means of a coil spring 46 encircling the bar between the lower end of the carriage and the bracket 43 below it.

The clamp 36 is operatively connected by a flexible tube 48 and a wire 49 with a hand lever (not shown) on the handlebars in the same way as the clamp first described. However, there is no tube and wire connected with the brake. Instead, the upper ends of the brake levers 50 extend upwardly and support grooved rollers 51 at their upper ends, which engage the opposite sides of a cam bar 52, the front end of which is attached by screws 53 to the top of carriage 37. The two rollers are pressed against the cam bar by means of a coil spring 54 connecting the upper ends of the levers as shown in FIG. 6. While the brake blocks 55 are spaced from the wheel rim, the rollers engage a narrow portion of the cam bar that is of uniform width as shown in FIG. 5. However, when the hand lever is squeezed, the clamp 36 is applied to the wheel, which immediately moves the clamp and the carriage down bar 38. The carriage therefore pulls cam bar 52 forward so that a rearwardly diverging portion of the bar shown in FIG. 5 enters between rollers 51 and wedges them apart to apply the brake to the wheel and stop its rotation. When the hand lever is released, the clamp is released from the wheel so that spring 46 can return the carriage to its uppermost position, thereby moving cam bar 52 backward to release the primary brake.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a bicycle having a frame with a fork supported by a wheel rotatably mounted therein, a brake mounted on said fork and straddling the peripheral portion of the wheel, an arm beside the wheel extending substantially radially thereof with its outer end located forward of said brake, means pivotally connecting the inner end of the arm with said fork adjacent the axis of the wheel to allow the outer end of the arm to swing forward and backward in an arc, a floating clamp straddling the peripheral portion of the wheel in front of the brake and normally disengaged from the wheel, means mounting the entire clamp on the outer end of said arm, the arm forming the sole support for the clamp, manually operable means connected with the clamp for clamping it against the forwardly rotating wheel so that the outer end of said arm will be swung forward by the wheel, a brake-actuating wire having one end connected to said brake, and means connecting the opposite end of the wire to said arm adjacent its inner end for applying the brake to the wheel when said arm is swung forward.

2. In a bicycle according to claim 1, the outer end of said arm projecting beyond the wheel, and said clamp-mounting means being secured to the outer end of the arm beyond the wheel.

3. In a bicycle according to claim 2, said clamp being a caliper type clamp that includes pivoted actuating levers provided with friction blocks for engaging the opposite sides of the wheel, said blocks being free of said arm and movable by said levers relative to the arm.

4. In a bicycle according to claim 2, said arm straddling said wheel and being formed from a pair of side members connected at their outer ends by a cross piece supporting said clamp.

5. In a bicycle according to claim 1, a spring connected with said arm for swinging it backward toward the brake when said clamp is released from the wheel.

6. In a bicycle according to claim 1, said brake being a caliper type brake that includes pivoted levers provided with friction blocks for engaging the opposite sides of the wheel, there being a flexible tube secured at its ends to one of said levers and to said fork adjacent the inner end of said arm, and said wire extending through said tube and being connected to the other of said levers.

7. In a bicycle according to claim 1, the outer end of said arm projecting beyond the wheel, said clamp being a caliper type clamp that includes a pair of levers provided with friction blocks for engaging the opposite sides of the wheel, said clamp-mounting means being a member pivotally connecting said levers to the outer end of the arm beyond the wheel, and said blocks being free of said arm and movable by said levers relative to the arm.

* * * * *